US008685874B2

(12) United States Patent
Shetty et al.

(10) Patent No.: US 8,685,874 B2
(45) Date of Patent: Apr. 1, 2014

(54) HIGH-TOUGHNESS ZETA-PHASE CARBIDES (75) Inventors: Dinesh K. Shetty, Salt Lake City, UT (US); Raymond A. Cutler, Bountiful, UT (US); Kenneth Hackett, Redondo Beach, CA (US); Shane Verhoef, Sandy, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 290 days.

(21) Appl. No.: 13/000,737

(22) PCT Filed: Jun. 23, 2009

(86) PCT No.: PCT/US2009/048283
§ 371 (c)(1),
(2), (4) Date: Mar. 28, 2011

(87) PCT Pub. No.: WO2010/008839
PCT Pub. Date: Jan. 21, 2010

(65) Prior Publication Data
US 2011/0287923 A1  Nov. 24, 2011

Related U.S. Application Data (60) Provisional application No. 61/074,860, filed on Jun. 23, 2008.

(51) Int. Cl.
*C04B 35/52* (2006.01)
*C04B 35/56* (2006.01)
(52) U.S. Cl.
USPC ............................................. 501/87; 501/93
(58) Field of Classification Search
USPC ..................................................... 501/87, 93
See application file for complete search history.

(56) References Cited

U.S. PATENT DOCUMENTS 5,407,464 A    4/1995 Kaliski
5,612,264 A *  3/1997 Nilsson et al. ................ 501/87
(Continued)

FOREIGN PATENT DOCUMENTS

JP      08-064110      3/1996
JP      2008031016     2/2008
(Continued)

OTHER PUBLICATIONS

Gusev et al. Ordering in the Zeta-Ta4C3-x Carbide Phase. JETP Letters, vol. 82, No. 5, 2005, pp. 287-291.*

(Continued)

*Primary Examiner* — Noah Wiese
(74) *Attorney, Agent, or Firm* — Thorpe North & Western LLP (57) ABSTRACT

A ceramic material having a high toughness can include carbon and a transition metal. The transition metal can have an elemental body centered cubic structure at room temperature. A substantial amount of the ceramic can be of a rhombohedral $\zeta$ phase of the transition metal and carbon. These materials can have a high thermal shock resistance, high fracture toughness, and good high temperature performance. A particulate mixture of a carbon source and a transition metal source can be assembled (12) and reacted (14) under high pressure and high temperature. The transition metal source can include a transition metal of a metal which has an elemental BCC structure at room temperature. The particulate mixture carbon to transition metal ratio is chosen so as to achieve a zeta phase carbide and processing is affected in order to retain the zeta phase at a substantial weight percent of the material (i.e. greater than about 5 wt %). The carbide ceramic can be cooled (16) and depressurized (18) to acquire the ceramic material.

14 Claims, 8 Drawing Sheets

(56) References Cited

U.S. PATENT DOCUMENTS

| | | | |
|---|---|---|---|
| 5,948,715 | A | 9/1999 | Brandt et al. |
| 6,510,694 | B2 | 1/2003 | Bruno et al. |
| 6,673,449 | B2 | 1/2004 | Bruno et al. |
| 2005/0064247 | A1 | 3/2005 | Sane et al. |
| 2006/0088435 | A1 | 4/2006 | Gupta et al. |
| 2006/0144037 | A1 | 7/2006 | Metcalfe et al. |
| 2006/0280640 | A1 | 12/2006 | Schlesser et al. |
| 2007/0059501 | A1 | 3/2007 | Kaneko et al. |

FOREIGN PATENT DOCUMENTS

| | | |
|---|---|---|
| JP | 2008081362 | 4/2008 |
| KR | 10-2000-0016327 | 3/2000 |
| WO | WO 00/26926 | 5/2000 |

OTHER PUBLICATIONS

Alexandre et al.; Solid State Reaction Between Tantalum (ta) and Tantalum Carbide (TaC) Powders During Hiping; Key Engineering Materials; 1997; vols. 132-136; pp. 868-871.

Balani et al.; Synthesis, Microstructural Characterization, and Mechanical Property Evaluation of Vacuum Plasma Sprayed Tantalum Carbide; J. Am. Ceram. Soc.; 2006; vol. 89, No. 4; pp. 1419-1425.

Graeve et al.; Electric Field Enhanced Synthesis of Nanostructured Tantalum Carbide; J. Mater. Res.; 2002; vol. 17, No. 3; pp. 609-613.

Hackett et al.; Phase Constitution and Mechanical Properties of Carbides in the Ta-C System; JACE.; Jun. 2, 2009; Manuscript No. 25971; pp. 1-4.

PCT Application PCT/US2009/048283; filing date Jun. 23, 2009; Dinesh Shetty; ISR mailed Mar. 5, 2010.

Rowcliffe et al.; Structure and Properties of Tantalum Carbide Crystals; Journal of Materials Science; 1970; vol. 5; pp. 345-350.

Stanciu; Structure—Properties Corelation in Sintered Hard Alloys with High Toughness and Strength; The Annals of "Dunarea De Jos" University of Galati. Fascicle IX. Metallurgy and Materials Science; 2007; No. 1, pp. 90-93.

Storms et al.; The Vanadium-Vanadium Carbide System; J. Phys. Chem.; Aug. 1962; vol. 66 No. 8; pp. 1401-1408.

Xu et al.; Dynamic Consolidation of TaC and Nano-YSZ Powders (Preprint); SAMPE Conference; 2006; pp. 1-9.

Yvon et al.; On the Crystal Chemistry of the Close Packed Transition Metal Carbides, I. The Crystal Structure of the $\zeta$-V, Nb and Ta Carbides; Acta Cryst. 1970; vol. B26; pp. 149-153.

Parthe et al.; On the Crystal Chemistry of the Close Packed Transition Metal Carbides, II. A Proposal for the Notation of the Different Crystal Structures; Acta Cryst.; 1970; vol. B26; pp. 153-163.

Zhang et al.; Hot Pressing of Tantalum Carbide With and Without Sintering Additives; J. Am. Ceram. Soc.; 2007; vol. 90, No. 2; pp. 393-401.

\* cited by examiner

HIGH-TOUGHNESS ZETA-PHASE CARBIDES

RELATED APPLICATIONS

This application claims priority to U.S. Provisional Application No. 61/074,860, filed Jun. 23, 2008, and entitled "High-Toughness Zeta-Phase Carbides," which application is incorporated by reference in its entirety herein.

FIELD OF THE INVENTION

This invention relates to carbide materials, including zeta phase carbides, exhibiting high toughness.

BACKGROUND OF THE INVENTION AND RELATED ART

Carbide materials are often used in high-temperature applications. Tantalum carbide (TaC), for example, is utilized in forming booster rocket motor nozzles. While TaC is chemically compatible with the aluminum propellant and has a high melting point, other properties, such as strength, thermal shock-resistance, and ultimately durability in applications wherein components are stressed under rapid temperature changes leave much to be desired. However, few materials meet the initial temperature resistance requirements, and as such, TaC continues to be used.

BRIEF DESCRIPTION OF THE DRAWINGS

Features and advantages of the present invention will be apparent from the detailed description that follows, and when taken in conjunction with the accompanying drawings together illustrate, by way of example, features of the invention. It will be readily appreciated that these drawings merely depict representative embodiments of the present invention and are not to be considered limiting of its scope, and that the components of the invention, as generally described and illustrated in the figures herein, could be arranged and designed in a variety of different configurations. Nonetheless, the present invention will be described and explained with additional specificity and detail through the use of the accompanying drawings, in which.

DETAILED DESCRIPTION OF EXEMPLARY EMBODIMENTS

Reference will now be made to exemplary embodiments, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

DEFINITIONS

In describing and claiming the present invention, the following terminology will be used in accordance with the definitions set forth below. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

It must be noted that, as used in this specification and the appended claims, the singular forms "a," "an," and "the" include plural referents unless the context clearly dictates otherwise. Thus, for example, reference to "a transition metal" includes one or more of such transition metals and reference to "a depressurizing step" includes reference to one or more of such steps.

As used herein, "substantially," when used in reference to a quantity or amount of a material, or a specific characteristic thereof, refers to an amount that can be sufficient to provide an effect that the material or characteristic was intended to provide. The exact degree of deviation allowable may in some cases depend on the specific context. Similarly, the term "substantial amount" refers to a majority of the composition. The exact degree, greater than a majority, can vary depending on use and material. In one aspect, "substantial amount" can indicate a measurable compositional amount. However, depending on the context, a "substantial amount" can mean a compositional amount of greater than about 1%, 10%, 30%, 50%, and any other composition value within those ranges.

As used herein, a plurality of items, structural elements, compositional elements, and/or materials may be presented in a common list for convenience. However, these lists should be construed as though each member of the list can be individually identified as a separate and unique member. Thus, no individual member of such list should be construed as a de facto equivalent of any other member of the same list solely based on their presentation in a common group without indications to the contrary.

Concentrations, amounts, thicknesses, parameters, volumes, and other numerical data may be expressed or presented herein in a range format. It is to be understood that such a range format can be used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

Embodiments of the Invention

A carbide ceramic material having high fracture toughness can be formed in accordance with the present invention. The ceramic material can be comprised of one or more carbides, with at least one phase contributing to the high fracture toughness as measured by the single-edge-precracked-beam (SEPB) technique at room temperature. In one aspect, the carbide material can include a transition metal and carbon, where the transition metal has an elemental body centered cubic structure at room temperature. That is to say that the transition metal, when in pure elemental form at room temperature, has a body centered cubic structure. The ceramic material can have the further characteristic of including a substantial amount of a rhombohedral ζ phase.

In one aspect, the transition metal can be selected from the group consisting of tantalum, vanadium, and niobium. In the instance wherein the transition metal comprises or is composed of tantalum, the atomic ratio of carbon to tantalum (C/Ta) in the ceramic material having a substantial amount of a rhombohedral ζ phase can be from about 0.55 to about 0.77. In a further embodiment, the atomic ratio (C/Ta) can range from about 0.6 to about 0.7, or optionally from about 0.62 to about 0.64. Variations within these ranges allow for customization of the amount of rhombohedral ζ phase. For example, about 0.6 can give about 80 wt % rhombohedral ζ phase, about 0.7 can give about 45 wt % rhombohedral ζ phase, while about 0.62 to 0.64 can give up to about 90 wt % rhombohedral ζ phase or greater.

Tantalum carbides including a substantial amount of a rhombohedral ζ phase exhibit a fracture toughness superior to the fracture toughness of the face centered cubic (fcc) form, TaC. In one aspect, the fracture toughness of the material including a substantial amount of the ζ phase can be greater than about 2 times or even greater than about 2.5 times the fracture toughness of fcc TaC. In a specific embodiment, a tantalum carbide containing multiple phases, as described herein, can have a fracture toughness as measured by the SEPB technique from about 10 MPa√m to about 15 MPa√m. In a further embodiment, the tantalum carbide containing multiple phases can have a fracture toughness at or near about 12.5 MPa√m.

The ceramic materials according to the present invention can also exhibit improved strength. The strength can be compared to that exhibited by the face centered cubic structure of the related carbide. In one embodiment, the strength can be 1.5 times the strength of the face centered cubic structure. As a specific embodiment, the strength of a tantalum carbide including substantial amount of the rhombohedral ζ phase can be from about 600 MPa to about 800 MPa. In a specific embodiment, the strength can be at or near about 675 MPa.

As mentioned, in one aspect of the ceramic material having a substantial amount of a rhombohedral ζ phase the transition metal can be vanadium. For instance, in a variety of representative embodiments the vanadium and carbon can be present in an atomic ratio of carbon to vanadium (C/V) of from about 0.54 to about 0.7, or from about 0.58 to about 0.65, or further from about 0.61 to about 0.62. The vanadium carbide including the ζ phase material can have, in one aspect, a fracture toughness of the material greater than about 2 times the fracture toughness of a face centered cubic form VC.

In another aspect of the ceramic material having a substantial amount of a rhombohedral ζ phase the transition metal can be niobium. Similarly, in various embodiments, the carbon and niobium can be present in an atomic ratio (C/Nb) of about 0.57 to about 0.72, from about 0.64 to about 0.7, or from about 0.67 to about 0.68. The fracture toughness of the niobium carbide material can be greater than about 2 times the fracture toughness of a face centered cubic form NbC.

As noted, the ceramic materials of the present invention include greater than about 5 wt % of a rhombohedral carbide phase referred to as ζ phase. In a specific embodiment, the material includes greater than about 20 wt % of the ζ phase. In further embodiments, the material can be greater than about 45 wt % of the ζ phase, or even greater than 80 wt % of the ζ phase. A monolithic rhombohedral carbide ζ phase can be formed having greater than about 90 wt % of the ζ phase. Thus, in some embodiments, the carbide ceramic material, as described herein, can be formed in a substantially homogeneous cohesive solid mass which can be independent from a given substrate. However, this material can also be formed as a coating or film, if desired. In a particular embodiment, the material can be sintered. In a further embodiment, the material can optionally include second phases including but not limited to grain growth inhibitors. Examples of potential second phases include such other high-temperature carbides as WC or MoC and HfC or ZrC. The selection of the second phases can be based on high melting points and limited solid solubility with the host carbide. They should also have lower free energy of formation than the host material and should segregate at grain boundaries. The second phases can also be non-carbides such as borides, nitrides and oxides.

This invention requires that a specific phase, commonly known as a zeta carbide and having a rhombohedral crystal structure, be present in a concentration of at least 5 wt %. It is believed that this particular phase results in enhanced fracture toughness, which can give improved strength. As such, these materials exhibit superior properties desirable in a number of applications, such as use as wear parts, cutting tools, etc. It is generally thought that the nature of the phase assemblage in this material allows for cleavage cracking of specific crystallographic planes which results in the improved properties such as toughness and strength.

Similarly, a method of forming a sintered ceramic material with a fracture toughness as measured by the SEPB technique in excess of 10 MPa√m at room temperature is presented here. The method can include assembling a particulate mixture including a carbon source and a transition metal, where the transition metal has an elemental body centered cubic structure. The carbon and/or transition metal can be provided as elemental powders (graphite, Ta, etc.), as metal carbides (i.e.

TaC, VC or NbC powder), or as a mixture (Ta and TaC powders). Thus, the carbon source material can be the transitional metal carbide, graphite, or other carbon source as long as the stoichiometric ratio is maintained and the level of impurities minimized sufficient to prevent substantial degradation of fracture toughness, etc. Optional processing additives can be included which enhance sintering and/or final properties of the material. For example, small amounts of Fe, Ni, Co, Hf, and/or W can be included as processing aids. Typically, such aids are present at no more than 2 to about 5 wt % although optimal amounts can be determined through routine experimentation. Currently, Fe and Co appear to provide good results and can be introduced during milling of the particulate mixture.

The step of assembling a particulate mixture can include mixing particulate transition metal with particulate transition metal carbide. In the case of tantalum carbide, Ta and TaC can be mixed in particulate form (e.g. generally provided as a 1 µm to about 2.5 µm particulate). Regardless, the mixing can optionally include a milling step to reduce agglomerates and/or reduce particle size. Such milling can in some cases allow the zeta-phase carbide to nucleate at a lower temperature than without such treatment. Although particle sizes can vary, in one aspect, the particulate mixture can have average particle sizes from about 500 nm to about 3 µm, and in one aspect about 1 µm to about 2.5 µm. In one aspect, the particulate starting materials can be milled using a ball mill.

The particulate mixture can be reacted under pressure and temperature to form a ceramic material comprising at least five (5) wt % of a rhombohedral $\zeta$ phase. Such reaction can include sintering. The method can also include cooling the carbide ceramic material to retain substantially a $\zeta$ phase. The cooling can be to room temperature. The carbide ceramic material can also be depressurized to retain substantially a $\zeta$ phase. In one aspect, the cooling can be done while maintaining the high pressure.

It should be noted that the present inventors do not claim to have discovered a $\zeta$ phase of material per se. However, as can be gleaned from prior-related phase diagrams, the $\zeta$ phases were thought only to be stable at high temperatures. Thus, the ability to process the material at high temperatures and retain metastably the $\zeta$ phase at low temperatures, such as can be completed by rapid cooling or by cooling under pressure, is a surprising and unexpected result not previously recognized the art. Consequently, the inventors have discovered a material having a substantial amount of a rhombohedral $\zeta$ phase, and a method of making the same, that can be retained at workable temperatures far lower than previously identified, down to and including room temperature, and wherein the material can be included in a variety of tools and systems.

The method, as outlined herein and above, can include cooling and depressurizing substantially simultaneously. In one aspect, the step of cooling includes a plurality of steps. In a specific example, the step of cooling includes cooling the carbide ceramic material to a temperature of about 900° C. to about 1100° C. and allowing depressurization prior to further cooling. Alternatively, the step of cooling can be substantially complete, or down to about room temperature, prior to the step of depressurizing. The present invention has discovered that maintaining the pressure to room temperature is beneficial to retaining a high amount of the $\zeta$-phase.

Processing times can greatly vary depending on the reactants and equipment, however in one aspect, the material can be maintained at high pressure and high temperature for greater than about an hour and often processing can be for greater than about 2 hours. Similarly, the temperature and pressure settings used can vary to account for materials, equipment, etc.; however, in one aspect of the present invention, a temperature of about 1350° C. to about 1900° C. can be utilized. In another aspect, a pressure of about 24 MPa to about 30 MPa can be utilized to react the particulate mixture. In another aspect, densification can be carried out in a hot-isostatic press (HIP) at pressures up to 300 MPa and cooled under pressure to maximize the $\zeta$-phase retained at room temperature. In one alternative aspect, the processing can occur in a substantial absence of oxygen.

In one aspect, the carbon can be present as a starting material in a carbide compound with the transition metal. Such can be the case where with a tantalum carbide reaction utilizing TaC and Ta as reactants. As also demonstrated by the example, in one aspect, the transition metal can be present in a particulate carbide compound.

While it has been recognized that small fractions of rhombohedral carbide can be retained at room temperature, it was unanticipated that these materials comprised of a transition metal and carbon having a substantial amount of a rhombohedral $\zeta$ phase could have high fracture toughness. The inventors were surprised at the high fracture toughness values obtained and recognized subsequently that these materials contained a substantial quantity of the rhombohedral phase at room temperature. A Rietveld analysis was used to show that the toughened materials made to date contain between about 40-80 wt % of the rhombohedral carbide. While some have speculated that a hexagonal phase, such as $M_2C$ carbides, where M can be a transitional metal, can result in enhanced toughness, it was unexpected to find that $M_4C_3$ rhombohedral carbides were desirable due to their high fracture toughness.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Examples

Figure 1:
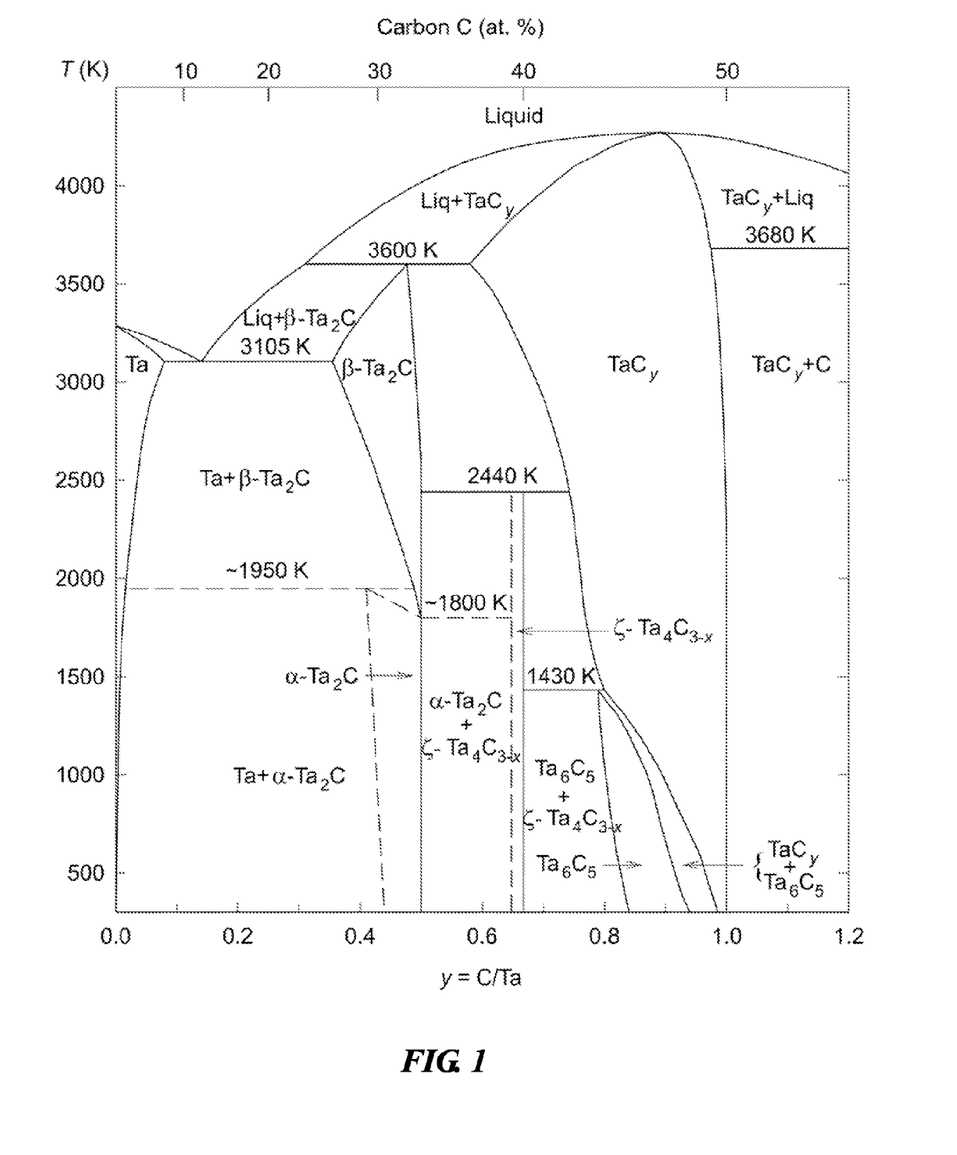
FIG. 1 is a phase diagram of the Ta—C system, in accordance with a representative embodiment of the present invention.

Tantalum carbide (TaC) can be of interest for high temperature (T>3000° C.) applications because of its high melting point. As shown in the phase diagram of FIG. 1, TaC can be significantly substoichiometric in carbon with composition ranging between $TaC_{0.73}$ and TaC at 2000° C., while maintaining the face-centered-cubic crystal structure ($TaC_x$). The properties of the $TaC_x$ phase change with the stoichiometry. As seen in the phase diagram, $TaC_x$ has a maximum melting point of about 4000° C. at a C/Ta ratio of about 0.9. The melting point decreases for both higher and lower carbon contents. The lattice parameter of the cubic phase decreases linearly from 4.4570 (±0.0010)° A for the stoichiometric composition, TaC, to about 4.4148° A for the composition, $TaC_{0.73}$. Single-phase, polycrystalline $TaC_{0.8}$ processed by hot-isostatic pressing of mixed Ta and TaC powders has a fracture strength ($\sigma_f$=281±5.5 MPa), fracture toughness ($K_{Ic}$=3.6±0.4 MPa√m) and Knoop microhardness at 1 N load ($H_K$=23.1±0.9 GPa). However, the variations of the mechanical properties with the stoichiometry of $TaC_y$ were not previously reported.

Composites of the tantalum-rich phase, $\alpha$-$Ta_2C$ in a matrix of $TaC_y$ or TaC with excess carbon at the grain boundaries can exhibit enhanced fracture toughness and thermal-shock resistance relative to single-phase TaC. However, no data have been reported in the literature for such composites. One research group did fabricate single-phase, hexagonal $\alpha$-$Ta_2C$ and reported high fracture toughness ($K_{Ic}$=9.7±0.8 MPa√m) with moderate fracture strength ($\sigma_f$=550±50 MPa) and low hardness ($H_K$=5.6±0.7 GPa).

By the present invention, a form of tantalum carbide, and other carbides, have been created having high fracture toughness and thermal-shock resistance. A variety of applications exist for such a material, including applications as booster propulsion nozzle components, cutting tools, and wear parts.

$TaC_y$ and $Ta_2C$ have been densified by either hot-pressing or hot-isostatic-pressing (HIP). The hot-pressing temperature required to achieve high density depends on the starting powder, particle size, degree of agglomeration, and sintering additives.

In accordance with a representative embodiment of the present invention, powders of TaC (Grade HGS, H. C. Starck Inc., Newton, Mass., Fisher sub-sieve size=1.04 μm) and Ta (Grade 73CP260, Inframat Advanced Materials LLC, Farmington, Conn., Fisher sub-sieve size=1-2.5 μm) were mixed in appropriate amounts to obtain nominal C/Ta ratios of 1.0, 0.9, 0.8, 0.7 and 0.6. (see Table 1).

TABLE 1

Densities, lattice parameters, weight percents of phases and percent theoretical densities of carbide phases at five nominal compositions in the Ta-C system.

| Material | Density (g/cc) | Lattice Parameters a (Å) | c (Å) | Weight Percents of Phases $TaC_y$ | $\zeta$-$Ta_4C_{3-x}$ | $\alpha$-$Ta_2C$ | Density (% Theor.) |
|---|---|---|---|---|---|---|---|
| TaC1.0 | 14.05 | 4.4534 | — | 100 | — | — | 97.1 |
| TaC0.9 | 14.03 | 4.4379 | — | 100 | — | — | 96.5 |
| TaC0.8 | 14.11 | 4.4244 | — | 100 | — | — | 96.7 |
| TaC0.7 | 14.20 | 4.4204 | — | 55.4 | | 0 | |
| | | 3.1279 | 30.0116 | | 44.6 | | |
| TaC0.6 | 14.26 | 3.1227 | 30.0388 | 0 | 79 | | |
| | | 3.1039 | 4.92273 | | | 21 | |
| TaC0.6* | 14.38 | 3.1199 | 30.0145 | 0 | 83 | | |
| | | 3.0985 | 4.9202 | | | 17 | |

The mixed powders were milled in isopropanol using WC—Co media. The milled and dried powders were hot-pressed in argon atmosphere using a heating rate of 15° C./minute from room temperature to 1400° C. and at 10° C./minute from 1400 to 1800° C. with an applied pressure of 27.6 MPa and the pressure and the peak temperature were maintained for 2 hours before cooling. The resulting billets, 44.5×44.5×5 mm, were cut and ground to size B bars defined in ASTM Standard C 1161-90. The materials were designated TaC1.0, TaC0.9, TaC0.8, TaC0.7 and TaC0.6 based on the C/Ta atomic ratios of the starting powders, and wherein the applied pressure during cooling was released at 1000° C. TaC0.6* was a TaC0.6 composition hot pressed under identical conditions, with the exception that full pressure was retained upon cooling to room temperature.

The densities measured on bars for the compositions 1.0, 0.9 and 0.8 were 97.1, 96.5 and 96.7% of theoretical, respectively, assuming the starting powder compositions define the C/Ta ratio of the $TaC_x$ phase and the variation of the lattice parameter of the face-centered-cubic phase is that determined by Bowman (a=4.3007+0.1563X in Å). The theoretical densities of the 0.7 and 0.6 compositions can be more difficult to establish because of the multiple phases present and possible errors in measuring their volume or weight fractions.

Without being bound to any particular theory, a variety of reasons, either acting alone or together, may have impacted the results of the formation of the ceramic tantalum carbide material. First, a comparison of these results with those of the Zhang research group indicate that milling of the as-received TaC and Ta powders appears to enhance densification during subsequent hot pressing over what is known in the art. This can be reflected by the lower hot-pressing temperature used in our study (1800° C.) as compared to that of Zhang (2400° C.). There may be multiple reasons for the enhanced sintering of the milled powders. Breakdown of agglomerates by milling can enhance sintering. The wear of the WC—Co milling media during ball milling also likely introduced WC and Co in the (TaC+Ta) powder mixture, including up to about 0.25 wt % Co and can act as a sintering aid and/or high temperature stability additive.

A second aspect is that a contaminant such as Co can be retained as a metal phase at the grain boundaries of TaC and may impact the carbide. If this is the case, the enhanced densification may well occur through liquid-phase sintering and the mechanical properties of the resulting cermet at high temperatures may be degraded due to the metal phase. Alternatively, Co may dissolve in $TaC_x$, segregate to the grain boundaries and act as an activated solid-state sintering additive.

Since single-phase $TaC_x$ and multiphase carbides have been densified to greater than 96.5% of theoretical density in our preliminary study, it is believed that these carbides can be pressureless sintered to closed porosity (typically at about 92% of theoretical density) followed by hot isostatic pressing to full density. This approach can be of interest to fabricate near-net-shape components such as nozzles and throat sections. Shaped green bodies can be formed directly from suspensions by colloidal filtration (slip casting), pressure filtration or colloidal pressing. Green bodies formed directly from stable suspensions can be free from agglomerates, possess high packing densities, and can sinter at much lower temperatures than compacts fabricated by dry-pressing.

Figure 2:
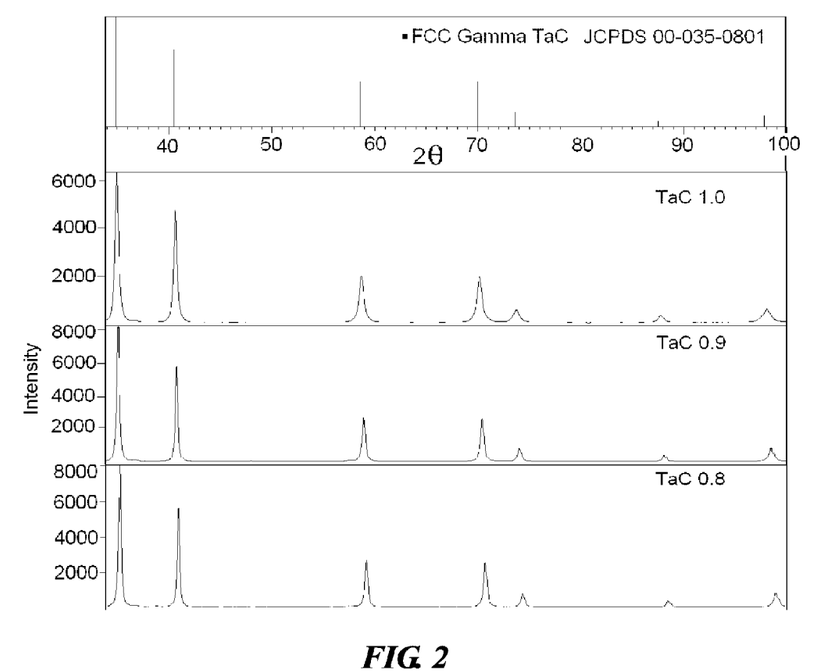
FIG. 2 is x-ray diffraction patterns from test bars fabricated from hot-pressed billets of nominal C/Ta ratios 1.0, 0.9 and 0.8.
Figure 3:
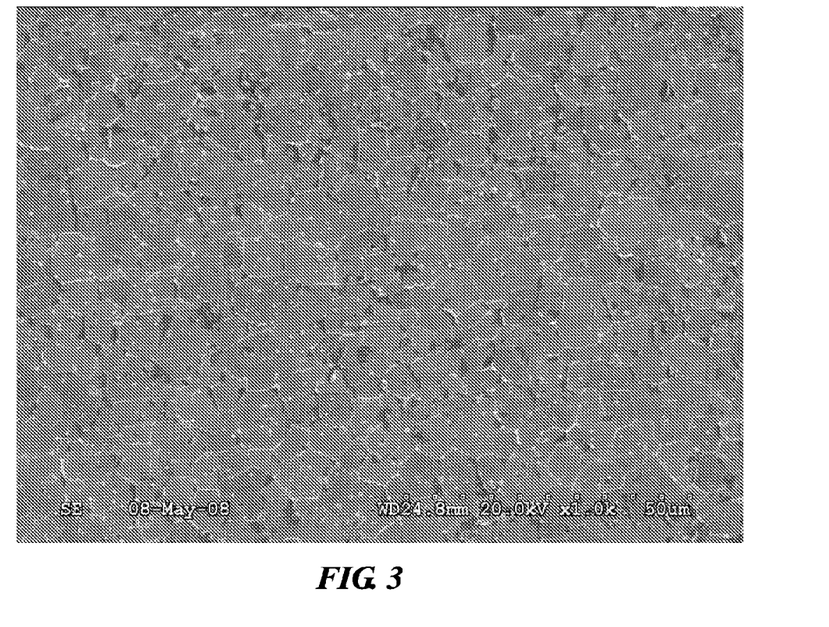
FIG. 3 is a scanning electron microscope photograph of the microstructure of single-phase, polycrystalline TaC with nominal C/Ta ratio of 1.0.

FIG. 2 shows a composite of the x-ray diffraction patterns obtained on bars fabricated from nominal compositions, 1.0, 0.9 and 0.8. Also included in the figure is a reference pattern for face-centered cubic TaC phase from the diffraction database (JCPDS 00-035-0801). All three of these compositions showed only the fcc phase. The lattice parameter increased linearly with atomic fraction of carbon, X, in line with Bowman's data and equation. FIG. 3 shows the microstructure of a specimen of 1.0 composition. It can be representative of all the three transition metal compositions. The average grain size of the face-centered cubic phase was 7.7±4.5 μm. This grain size can be large as compared to that observed by Zhang. This suggests that a liquid phase might have played a role in both the sintering and grain growth of these materials. Thus, it follows that powders processed without possible metallic contamination may be used to further minimize grain growth and enhance strength and hardness of these materials.

Figure 4:
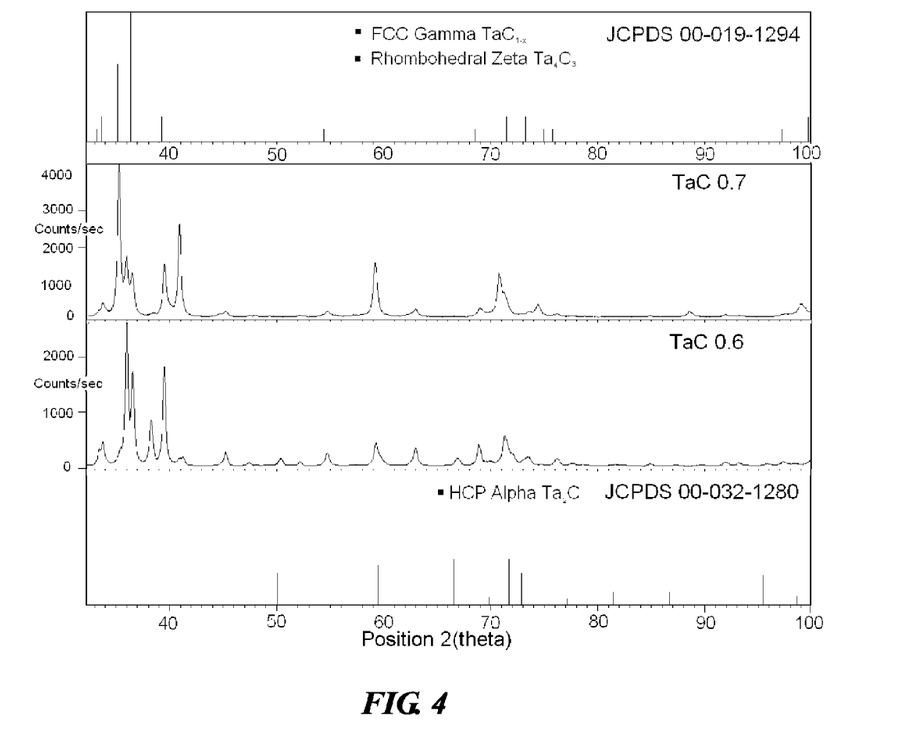
FIG. 4 is x-ray diffraction patterns from test bars fabricated from hot-pressed billets of nominal C/Ta ratios 0.7 and 0.6.

FIG. 4 shows the diffraction patterns of test bars fabricated from powders of nominal C/Ta ratios of 0.7 and 0.6. Based on the phase diagram of FIG. 1 it was anticipated that these compositions would produce mixtures of two phases, cubic TaC$_y$ (where y can be about 0.73) and hexagonal α-Ta$_2$C phase. However, the diffraction patterns of 0.7 and 0.6 compositions could not be rationalized only in terms of the cubic and the α phases. The diffraction pattern of the 0.7 composition was consistent with a mixture of the cubic and ζ-phase, while that of the 0.6 composition showed a mixture of ζ and the α-phase. The reference diffraction patterns of the ζ and the α-phases are also included in FIG. 4.

The ζ-phase in the Ta—C system has a crystal structure described as 12 close-packed metal layers with a stacking sequence ABABCACABCBC. Therefore, the ζ-phase may be characterized as a polytype consisting of mixed HCP (α-Ta$_2$C) and fcc (TaC$_y$) stacking sequences. Analyses of the diffraction patterns revealed that the 0.7 composition contained 55.4 wt % of cubic TaC$_{0.77}$ (based on a lattice parameter of 4.4204 Å for the cubic phase) and 44.6 wt % of the ζ-phase. Similarly, the 0.6 composition contained 83 wt % of the ζ-phase and 17 wt % of α-Ta$_2$C. The lattice parameters of the ζ-phase in the two compositions were close (a=3.1211 Å, c=30.0158 Å) and matches well with the a parameter of the α-Ta$_2$C phase (a=3.1033 Å, c=4.9289 Å).

Figure 5:
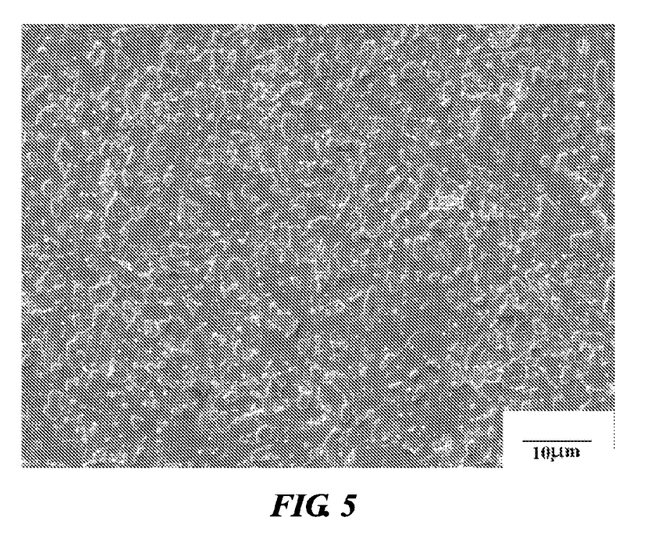
FIG. 5 is a scanning electron microscope photograph of the microstructure of nominal $TaC_{0.7}$ material showing two phases identified as $TaC_{0.77}$ and $\zeta$-phase.
Figure 6:
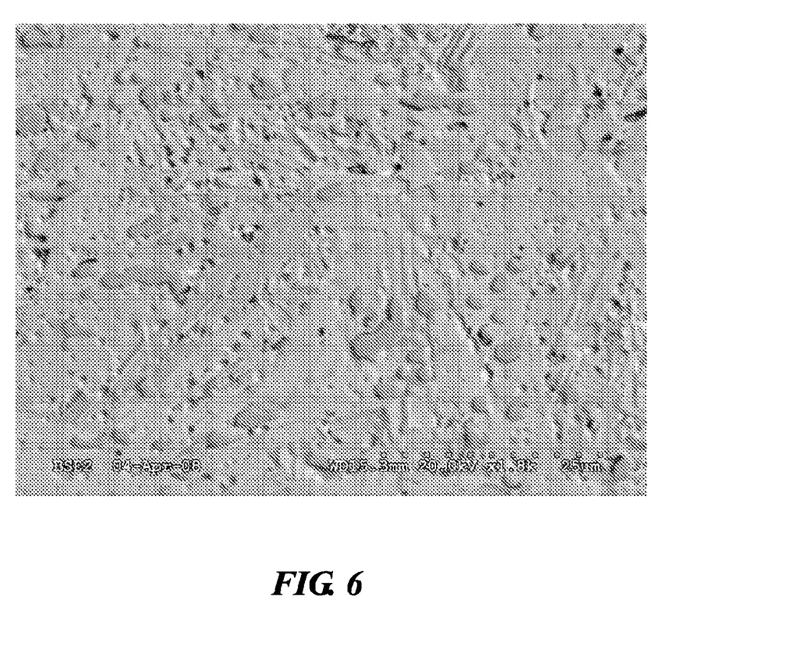
FIG. 6 is a scanning electron microscope photograph of the microstructure of nominal $TaC_{0.6}$ material showing two phases identified as $\alpha$-$Ta_2C$ and $\zeta$-phase.

FIGS. 5 and 6 show the microstructures of the materials with the nominal compositions, 0.7 and 0.6, respectively. The distinct isolated phases in the two cases are believed to be cubic TaC$_{0.77}$ and α-Ta$_2$C phase, respectively, while the platelet-like matrix can be the ζ-phase. These identifications are tentative and have not been confirmed by either electron-probe-micro-analysis or micro-diffraction.

A number of issues remain unresolved in the area of phase constitution and microstructure development in the Ta—C system. It can be known that the cubic TaC$_x$ and the α-Ta$_2$C phases can be fabricated as single-phase monolithic materials. From previous studies, it was not clear, however, if the ζ-phase can be fabricated as a single-phase or substantially single-phase. The inventors of the present invention determine that a nominal composition between 0.7 and 0.6 can lead to single ζ-phase material.

Figure 7:
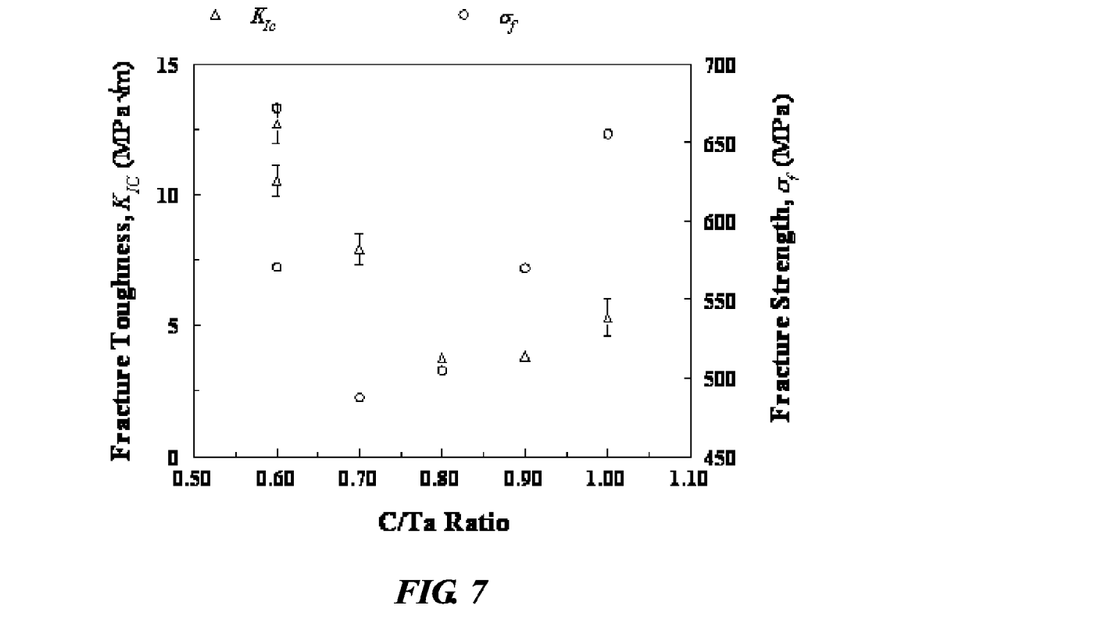
FIG. 7 is a graph of variations of fracture toughness ($K_{Ic}$) and fracture strength ($\sigma_f$) of carbides in the Ta—C system as functions of the nominal C/Ta ratio.
Figure 8:
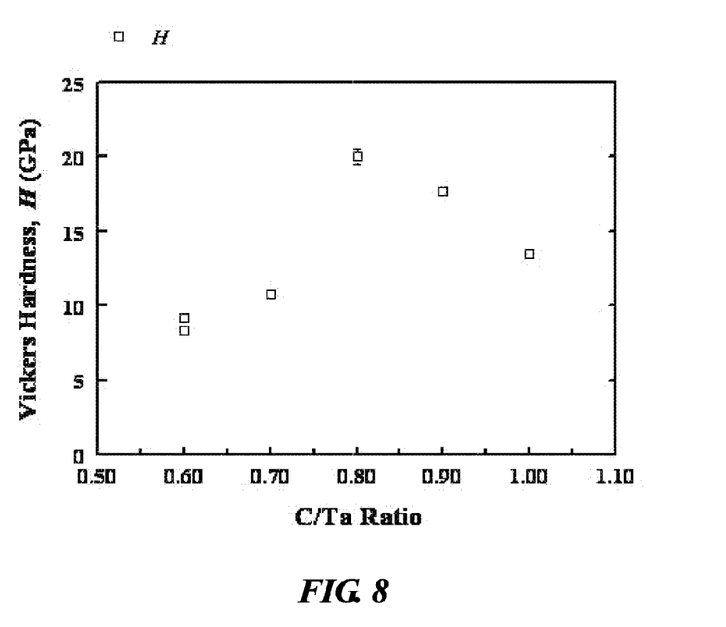
FIG. 8 is a graph of variation of Vickers hardness (10 N load) of carbides as a function of the C/Ta ratio in the Ta—C system.

FIG. 7 plots fracture toughness (K$_{Ic}$) and fracture strength (σ$_f$) of carbides in the Ta—C system as functions of the nominal C/Ta ratio of the starting powder mix. The fracture toughness was measured by the single-edge-precracked-beam method (ASTM Standard C 1421-01b), while the fracture strength was measured in four-point bending (ASTM Standard C 1161-90). For the stoichiometric TaC, fracture toughness was 5.3±0.7 MPa√m and the strength was 655±37 MPa. Both fracture toughness and strength decreased with decreasing C/Ta ratio in the single cubic phase regime. There was a reversal of this trend for C/Ta ratio less than 0.8. The best combination of fracture toughness and strength were obtained for the 0.6 composition with K$_{Ic}$=12.7±0.7 MPa and σ$_f$=672±25 MPa. It is interesting to note that this is the composition that had the highest weight percent of the ζ-phase. Vickers hardness, on the other hand, showed an opposite trend (FIG. 8). A maximum hardness of 20 GPa was measured at 10 N load on the 0.8 composition. The hardness decreased for both higher and lower values of the C/Ta ratio.

The fracture toughness measured for the 0.6 composition is exceptionally high for a ceramic. Again, without being bound to any particular theory, it is believed that the high fracture toughness is correlated with the weight fraction of the ζ-phase, believed to be about 83%. If this trend is correct, we should expect the highest fracture toughness for a material made of single ζ-phase.

Figure 9:
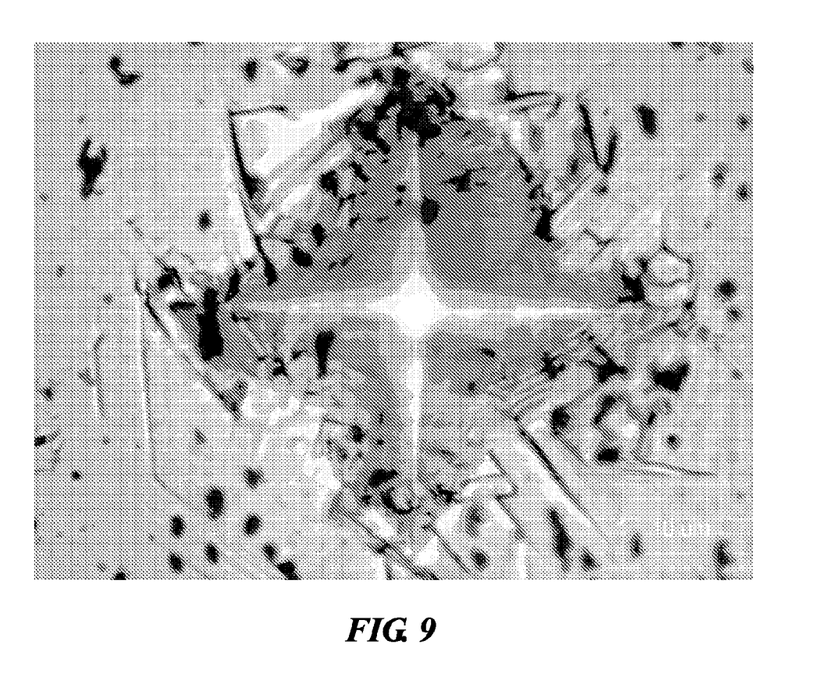
FIG. 9 is a scanning electron microscope photograph of a Vickers hardness impression on a 0.6 composition material produced at 10 N load.

The mechanism of toughening in a polycrystalline ζ-phase material is next examined. Examination of Vickers impression (FIG. 9) on a 0.6 composition material shows what appear to be cracks along crystallographic planes of the platelet structure of the ζ-phase. This suggests stress-induced microcracking along cleavage planes of the ζ-phase. Typically, the stress for microcracking increases with decreasing grain size and there can be an optimum grain size for maximum fracture toughness. Materials that exhibit high SEPB fracture toughness typically also exhibit R-curve behavior, i.e., fracture toughness of the material increases with increasing crack growth. The ζ-phase material appears to exhibit R-curve behavior. Such R-curves may usually be associated with a process zone (bridging zone, transformation zone or microcrack zone).

Grain growth inhibitors are known in WC—Co systems, with vanadium, chromium, niobium and tantalum carbides among the most prevalent for limiting the grain growth of WC. The grain growth inhibitor should have a lower free energy of formation than the host material and should segregate at grain boundaries. The method of incorporating the grain growth inhibitor can be very important since typically only small quantities may be needed. Phase equilibria data can be used to look for compatible secondary materials that can be added as composite systems. Inclusion of useful grain growth inhibitors may broaden the use for new materials for cutting and/or wear applications.

Figure 10:
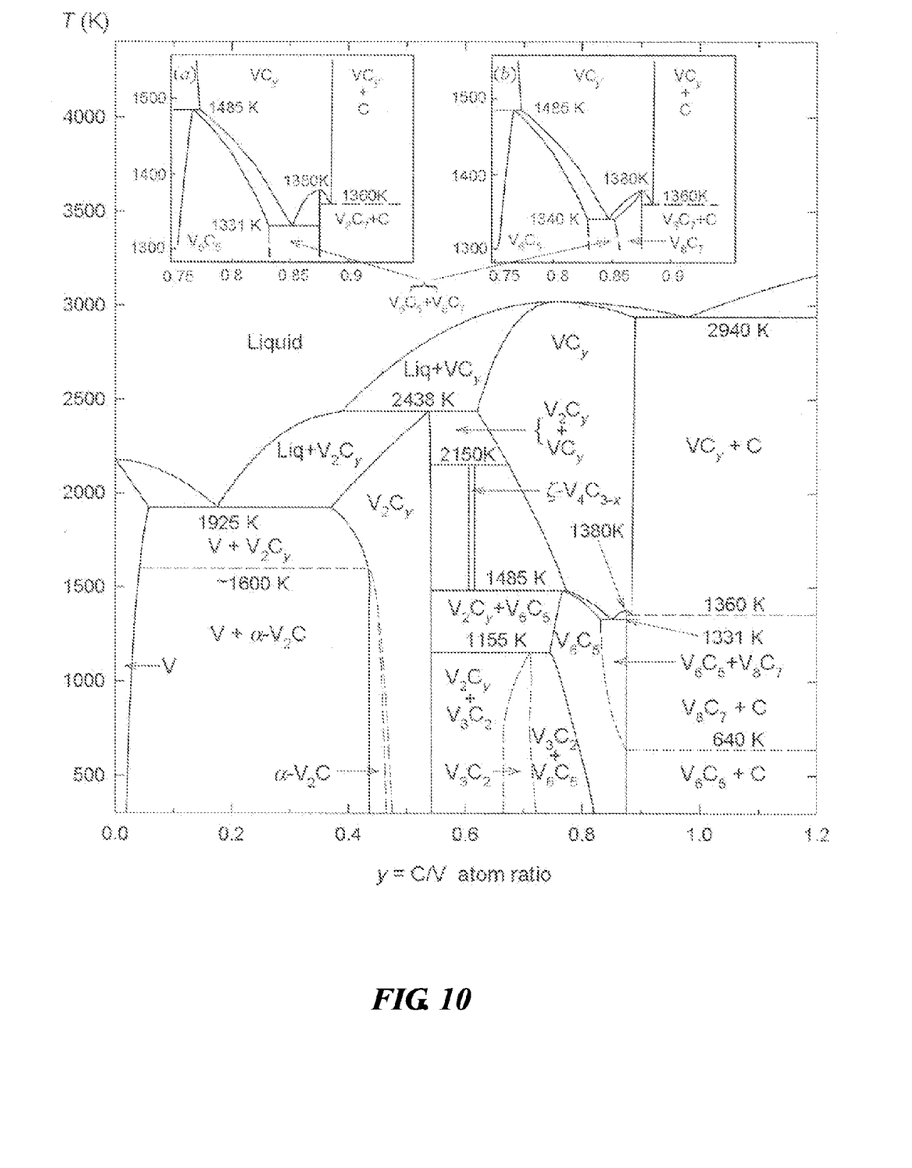
FIG. 10 is a phase diagram of the V—C system, in accordance with a representative embodiment of the present invention.
Figure 11:
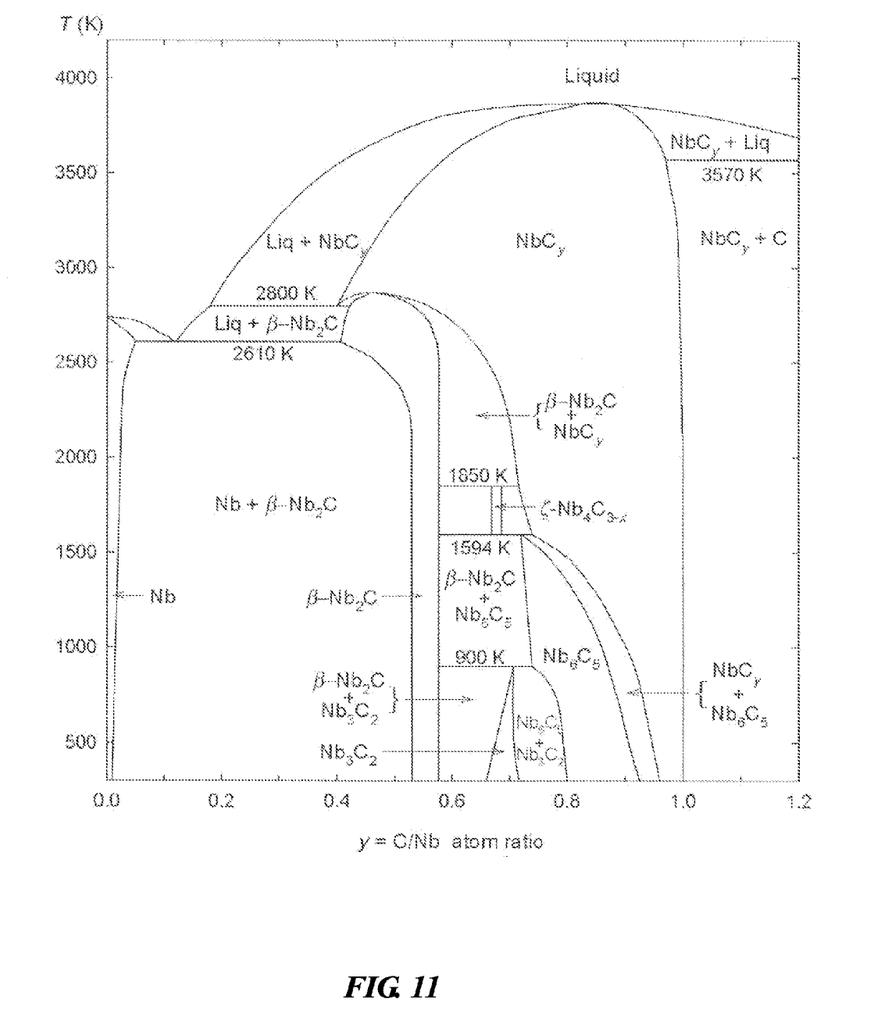
FIG. 11 is a phase diagram of the Nb—C system, in accordance with a representative embodiment of the present invention.

The above description can be directed to tantalum carbide including a substantial amount of ζ-phase. It should be understood that the above described materials and methods can be applicable to transition metal carbides wherein the transition metal has an elemental body centered cubic structure at room temperature. Additional representative embodiments of the present invention can include vanadium and niobium. For example, FIG. 10 is a phase diagram of the V—C system, while FIG. 11 is a phase diagram of the Nb—C system, both in accordance with representative embodiments of the present invention.

Figure 12:
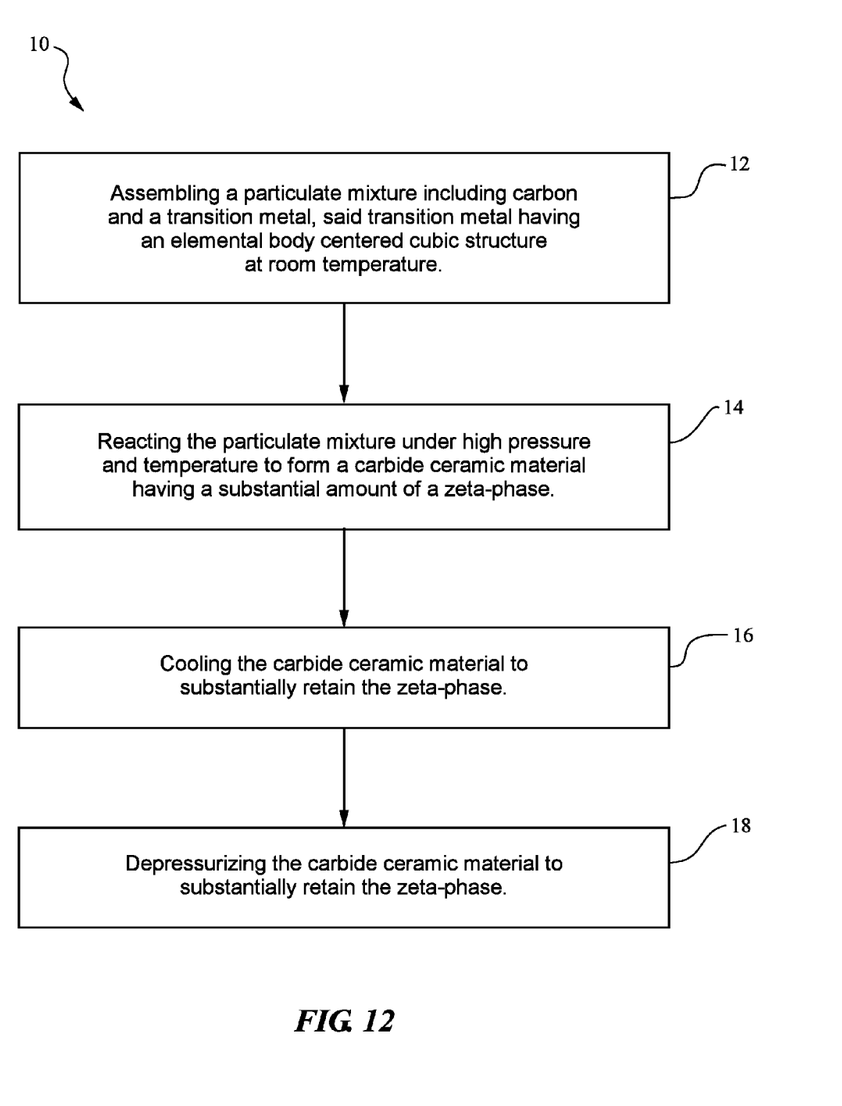
FIG. 12 is a flowchart depicting a method of forming a ceramic material having a substantial amount of a $\zeta$-phase and high fracture toughness, in accordance with a representative embodiment of the present invention.

Illustrated in FIG. 12 is a flowchart depicting a method 10 of forming a ceramic material having a substantial amount of a ζ-phase and high fracture toughness, in accordance with a representative embodiment of the present invention. The method can include assembling 12 a particulate mixture including a carbon source and a transition metal, in which the transition metal has an elemental body centered cubic structure at room temperature. The method can also include reacting 14 the particulate mixture under high pressure and temperature to form a carbide ceramic material having a substantial amount of a ζ-phase. The method can further include cooling 16 the carbide ceramic material to substantially retain the ζ-phase, and depressurizing 18 the carbide ceramic material to substantially retain the ζ-phase.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function, and manner of operation, assembly, and use may be made without departing from the principles and concepts set forth herein.

What is claimed is:

1. A ceramic material having a high fracture toughness, comprising a transition metal and carbon, said transition metal having an elemental body-centered cubic structure at room temperature with at least about 90% weight of a rhombohedral ζ phase of the transition metal and carbon, wherein the transition metal is tantalum.

2. The material of claim 1, wherein the atomic ratio of carbon to tantalum is from about 0.62 to about 0.64.

3. The material of claim 1, wherein the material is substantially homogeneous throughout a cohesive solid mass.

4. The material of claim 1, wherein the material further includes a grain growth inhibitor.

5. A method of forming a ceramic material having a substantial amount of a rhombohedral ζ-phase and high fracture toughness, comprising:
   assembling a particulate mixture including a carbon source carbon and a transition metal which is tantalum, said transition metal having an elemental body centered cubic structure at room temperature;
   reacting the particulate mixture under high pressure and temperature to form a carbide ceramic material having a substantial amount of a ζ-phase;
   cooling the carbide ceramic material to substantially retain the ζ-phase; and
   depressurizing the carbide ceramic material to substantially retain the ζ-phase with at least about 90% weight of the rhombohedral ζ-phase of the transition metal and carbon.

6. The method of claim 5, wherein the cooling and the depressurizing occur substantially simultaneously.

7. The method of claim 5, wherein the step of cooling includes a plurality of steps.

8. The method of claim 7, wherein the step of cooling includes cooling the carbide ceramic material to a temperature of about 900° C. to about 1100° C. and allowing depressurization prior to further cooling.

9. The method of claim 5, wherein the step of cooling is substantially complete to about room temperature prior to the step of depressurizing.

10. The method of claim 5, wherein the step of assembling the particulate mixture includes mixing particulate transition metal with particulate transition metal carbide.

11. The method of claim 5, wherein the step of assembling the particulate mixture includes milling.

12. The method of claim 5, wherein the step of assembling the particulate mixture further includes incorporating a processing additive.

13. The method of claim 5, wherein the step of reacting the particulate mixture occurs at a temperature of about 1350° C. to about 1900° C.

14. The method of claim 5, wherein the step of reacting the particulate mixture occurs at a pressure of about 24 MPa to about 30 MPa.

* * * * *